(12) United States Patent
Gazzaley et al.

(10) Patent No.: US 12,053,707 B2
(45) Date of Patent: Aug. 6, 2024

(54) METHODS AND SYSTEMS FOR DIFFICULTY-ADJUSTED MULTI-PARTICIPANT INTERACTIVITY

(71) Applicant: The Regents of the University of California, Oakland, CA (US)

(72) Inventors: Adam Gazzaley, San Francisco, CA (US); Joaquin Anguera, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/801,350

(22) PCT Filed: Feb. 26, 2021

(86) PCT No.: PCT/US2021/019819
§ 371 (c)(1),
(2) Date: Aug. 22, 2022

(87) PCT Pub. No.: WO2021/173932
PCT Pub. Date: Sep. 2, 2021

(65) Prior Publication Data
US 2023/0073281 A1     Mar. 9, 2023

Related U.S. Application Data

(60) Provisional application No. 62/983,213, filed on Feb. 28, 2020.

(51) Int. Cl.
*A63F 13/843*   (2014.01)
*A63F 13/57*    (2014.01)
*G06F 3/01*     (2006.01)

(52) U.S. Cl.
CPC ............ *A63F 13/843* (2014.09); *A63F 13/57* (2014.09); *G06F 3/015* (2013.01); *A63F 2300/8082* (2013.01)

(58) Field of Classification Search
CPC .................. A63F 13/843; A63F 13/57; A63F 2300/8082; G06F 3/015
See application file for complete search history.

(56) References Cited

U.S. PATENT DOCUMENTS

| 4,679,789 A   | 7/1987 | Okada |
| 7,367,882 B2* | 5/2008 | Fukutome ............... A63F 13/47 463/40 |

(Continued)

OTHER PUBLICATIONS

Miles et al. (2012) "A review of virtual environments for training in ball sports" Computers and Graphics, 36 (6):714-726.

*Primary Examiner* — Malina D. Blaise
(74) *Attorney, Agent, or Firm* — Brian E. Davy; Mandar A. Joshi; Bozicevic, Field & Francis LLP

(57) ABSTRACT

The present disclosure provides computer-implemented methods for difficulty-adjusted multi-participant interactivity. Also provided are computer readable media and computer devices that find use, e.g., in practicing the methods of the present disclosure. In certain aspects, the disclosure pertains to closed-loop assessment and adaptive methods and systems designed to equilibrate difficulty challenge levels across multiple (two or more) participants in interactive activities. In some embodiments, a first individual presents a first simulated challenge to a second individual and the second individual responds to it. Depending upon the response of the second individual to the first challenge, the second challenge presented by the first individual to the second individual may be unchanged, made more difficult, or made less difficult so that the modified second challenge is commensurate with the skills of the second individual. Thus, the disclosure provides customized experiences for individuals of disparate physical abilities to enjoyably interact with each other.

17 Claims, 3 Drawing Sheets

(56) References Cited

U.S. PATENT DOCUMENTS

| | | | | |
|---|---|---|---|---|
| 8,753,165 | B2* | 6/2014 | Weston | A63H 33/26 446/175 |
| 9,352,213 | B2* | 5/2016 | Yim | G06F 3/0482 |
| 9,789,404 | B2* | 10/2017 | Taoka | A63F 13/67 |
| 2003/0040349 | A1* | 2/2003 | Imaeda | A63F 13/422 463/3 |
| 2006/0030383 | A1* | 2/2006 | Rosenberg | B25J 9/1689 463/1 |
| 2008/0081694 | A1* | 4/2008 | Hong | A63F 13/80 463/34 |
| 2010/0144424 | A1* | 6/2010 | Rogers | A63F 13/67 463/30 |
| 2011/0269528 | A1 | 11/2011 | Lester | |
| 2012/0115579 | A1* | 5/2012 | Buecheler | G07F 17/3239 463/23 |
| 2012/0157206 | A1* | 6/2012 | Crevin | A63H 3/28 463/36 |
| 2013/0078600 | A1* | 3/2013 | Fischer | G09B 19/00 434/236 |
| 2014/0121008 | A1* | 5/2014 | Canessa | A63F 13/95 463/29 |
| 2014/0273717 | A1* | 9/2014 | Judkins | A63H 3/28 446/175 |
| 2014/0295972 | A1* | 10/2014 | Inagawa | A63F 13/833 463/42 |
| 2015/0265934 | A1* | 9/2015 | Taylor | A63F 13/98 446/484 |
| 2015/0290545 | A1* | 10/2015 | Barney | A63F 13/21 463/31 |
| 2016/0042566 | A1 | 2/2016 | Xiaodong | |
| 2016/0067611 | A1 | 3/2016 | Carlton | |
| 2016/0151705 | A1* | 6/2016 | Ji | A63F 13/24 463/29 |
| 2016/0314609 | A1* | 10/2016 | Taylor | A63F 13/65 |
| 2016/0361663 | A1* | 12/2016 | Watry | H04L 67/10 |
| 2016/0375363 | A1 | 12/2016 | Connor et al. | |
| 2016/0381171 | A1* | 12/2016 | Anderson | H04L 65/765 709/217 |
| 2017/0056783 | A1* | 3/2017 | Akavia | A63H 33/26 |
| 2017/0113129 | A1* | 4/2017 | Doptis | A63F 13/28 |
| 2017/0173489 | A1* | 6/2017 | Akavia | A63H 33/3055 |
| 2018/0264365 | A1* | 9/2018 | Soederberg | A63F 13/98 |
| 2022/0047949 | A1* | 2/2022 | Kmita | A63F 13/358 |

* cited by examiner

One-Player Closed-Loop

Multi-Player Closed-Loop

B = Brain
S = Stimuli
D = Data $B^xS^2 = B^xS^1 + (\pm B^yD^1)$

METHODS AND SYSTEMS FOR DIFFICULTY-ADJUSTED MULTI-PARTICIPANT INTERACTIVITY

CROSS-REFERENCE TO RELATED APPLICATIONS

This application claims the benefit of U.S. Provisional Patent Application No. 62/983,213, filed Feb. 28, 2020, which application is incorporated herein by reference in its entirety.

INTRODUCTION

When individuals engage in an interactive experience, such as playing an interactive video game, an imbalance in their baseline skills results in a frustrating and dissatisfying experience. The individuals with higher skills would consistently dominate the individual with lower skills. For example, in a multiplayer video game played between a young adult and a senior, the senior may have significantly lower skills compared to the skills of the young adult. This would result in an uneven and one-sided contest that can cause frustration and dissatisfaction for the senior. Such negative experience would also discourage extended and repeated interactions.

SUMMARY

The present disclosure provides computer-implemented methods for difficulty-adjusted multi-participant interactivity. In some embodiments, the methods comprise rendering, via one or more processors, a first simulated object to a first individual; receiving, by the one or more processors, a first physical input produced by the first individual directed to the first simulated object; and applying, via the one or more processors, the first physical input to the first simulated object to produce a first stimulus comprising the first simulated object under the influence of the first physical input. Such methods may further comprise presenting, via the one or more processors, the first stimulus to a second individual; receiving, by the one or more processors, a first response by the second individual to the first stimulus; and rendering, via the one or more processors, a second simulated object to the first individual. Such methods may further comprise receiving, by the one or more processors, a second physical input produced by the first individual directed to the second simulated object; modifying, via the one or more processors, the second physical input to produce a modified second physical input based the first response by the second individual to the first stimulus; applying, via the one or more processors, the modified second physical input to the second simulated object to produce a second stimulus comprising the second simulated object under the influence of the modified second physical input; and presenting, via the one or more processors, the second stimulus to the second individual. Also provided are computer readable media and computer devices that find use, e.g., in practicing the methods of the present disclosure.

DETAILED DESCRIPTION

Figure 1:
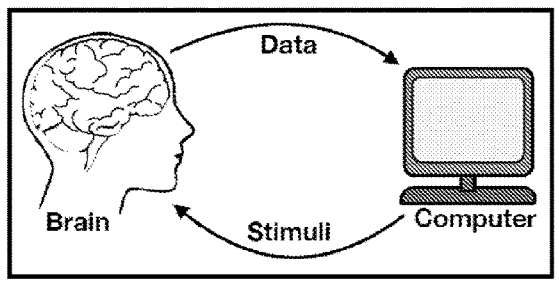
FIG. 1: One player closed loop disclosing adjustment by the computer based on the skills of the player.
Figure 2:
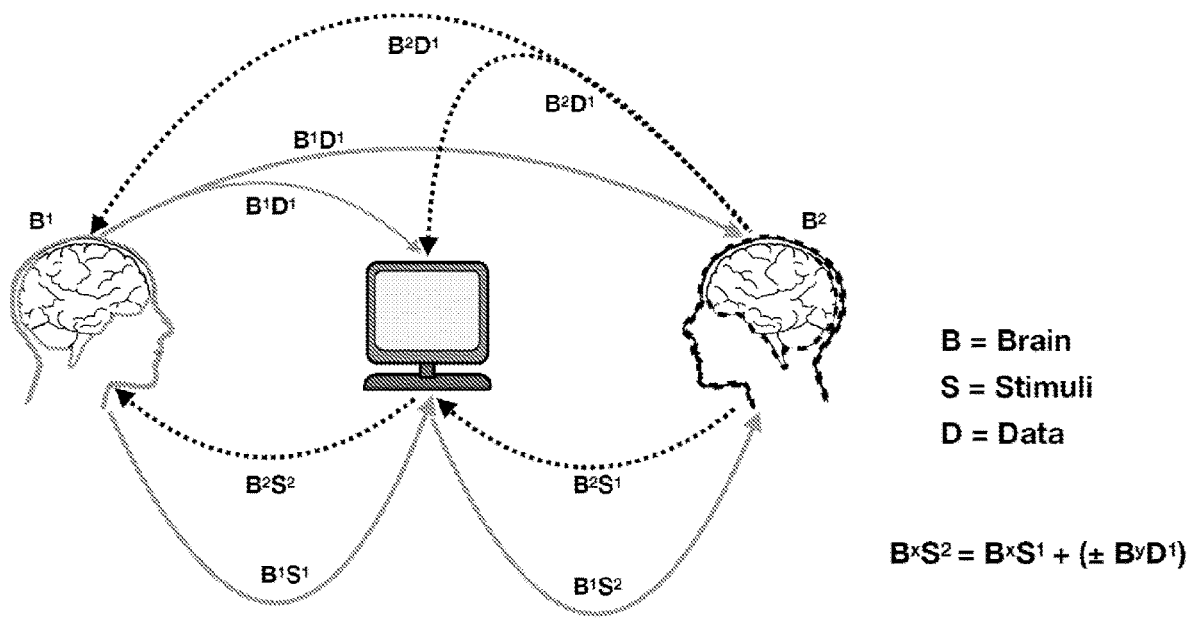
FIG. 2: Multi-player closed loop. An example of the computer-implemented methods for difficulty-adjusted multi-participant interactivity for two players according to embodiments of the present disclosure. A computer detects the physical input from participating players ($B^1$ and $B^2$) and performance from the participating players. The computer then modifies the inputs from the players according the performance of the other player over previous attempt or attempts. This method can be extrapolated to more than two players and, therefore, the x in the equation $[B^xS2=B^xS^1+(B^yD^1)]$ reflects a given individual (e.g., a first individual would be $B^1$) and y reflects the other individual (e.g., a second individual $B^2$). The equation considers the performance of an individual in previous trial or trials and its effect on presentation of the stimulus in the subsequent trial or trials.

Before the methods, computer-readable media and devices of the present disclosure are described in greater detail, it is to be understood that the methods, computer-readable media, and devices are not limited to the embodiments described, as such may, of course, vary. It is also to be understood that the terminology used herein is for the purpose of describing the embodiments only, and is not intended to be limiting, since the scope of the methods, computer-readable media, and devices will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed. The upper and lower limits of these smaller ranges may independently be included in the smaller ranges and are also encompassed, subject to any specifically excluded limit in the stated range. Where the stated range includes one or both the limits, ranges excluding either or both of those included limits are also included.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which the methods, computer-readable media and devices belong. Although any methods, computer-readable media and devices similar or equivalent to those described herein can also be used in the practice or testing of the methods, computer-readable media and devices, representative illustrative methods, computer-readable media and devices are now described.

All publications and patents cited in this specification are herein incorporated by reference as if each individual publication or patent were specifically and individually indicated to be incorporated by reference and are incorporated herein by reference to disclose and describe the materials and/or methods in connection with which the publications are cited. The citation of any publication is for its disclosure prior to the filing date and should not be construed as an admission that the present methods, computer-readable media and devices are not entitled to antedate such publication, as the date of publication provided may be different from the actual publication date which may need to be independently confirmed.

It is noted that, as used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements or use of a "negative" limitation.

It is appreciated that certain features of the methods, computer-readable media and devices, which are, for clarity, described in the context of separate embodiments, may also be provided in combination in a single embodiment. Conversely, various features of the methods, computer-readable media and devices, which are, for brevity, described in the context of a single embodiment, may also be provided separately or in any suitable sub-combination. All combinations of the embodiments are specifically embraced by the present disclosure and are disclosed herein just as if each combination was individually and explicitly disclosed, to the extent that such combinations embrace operable processes and/or compositions. In addition, all sub-combinations listed in the embodiments describing such variables are also specifically embraced by the present methods, computer-readable media and devices and are disclosed herein just as if each such sub-combination was individually and explicitly disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods, computer-readable media, and devices. Any recited method can be carried out in the order of events recited or in any other order that is logically possible.

Methods

As summarized above, provided herein are computer-implemented methods for difficulty-adjusted multi-participant interactivity. In certain embodiments, the methods comprise rendering, via one or more processors, a first simulated object to a first individual; receiving, by the one or more processors, a first physical input produced by the first individual directed to the first simulated object; and applying, via the one or more processors, the first physical input to the first simulated object to produce a first stimulus comprising the first simulated object under the influence of the first physical input. Such methods may further comprise presenting, via the one or more processors, the first stimulus to a second individual; receiving, by the one or more processors, a first response by the second individual to the first stimulus; and rendering, via the one or more processors, a second simulated object to the first individual. Such methods may further comprise receiving, by the one or more processors, a second physical input produced by the first individual directed to the second simulated object; modifying, via the one or more processors, the second physical input to produce a modified second physical input based the first response by the second individual to the first stimulus; applying, via the one or more processors, the modified second physical input to the second simulated object to produce a second stimulus comprising the second simulated object under the influence of the modified second physical input; and presenting, via the one or more processors, the second stimulus to the second individual.

The methods and systems disclosed herein allow an individual to engage in multiplayer interactivity at a difficulty level that is appropriate to his/her skills and matched to others so that the individual can engage in a balanced competition/co-operation experience. The disclosure implements "digital handicapping" to the stronger player(s) in a multiplayer interactivity and presents to the weaker player(s) in the multiplayer interactivity the challenges that are commensurate and proportional to the skills of the weaker players. Such digital handicapping ensures that multiple individuals with varying skill levels may perform at the peaks of their abilities while the difference in the skill levels of the individuals does not affect or only affects minimally their enjoyment of the multiplayer interactivity. Thus, the methods and systems disclosed herein facilitate a more enjoyable and balanced interactive experience between individuals who differ in skill level.

Certain embodiments of the disclosure provide computer-implemented methods for difficulty-adjusted multi-participant interactivity, where an actual challenge presented by a first individual to a second individual is modified by the systems of the invention so that the modified challenge is more difficult or less difficult than the actual challenge presented by the first player. The modification of the actual challenge to a more difficult or less difficult modified challenge is performed according to the skills of the second player. Details regarding non-limiting embodiments of the methods of the present disclosure will now be provided.

According to some embodiments, the methods of the present disclosure are computer-implemented. By "computer-implemented" is meant at least one step of the method is implemented using one or more processors and one or more non-transitory computer-readable media. The computer-implemented methods of the present disclosure may further comprise one or more steps that are not computer-implemented.

The methods of the present disclosure comprise rendering, via one or more processors, a first simulated object to a first individual, and receiving, by the one or more processors, a first physical input produced by the first individual directed to the first simulated object. Any simulated object that finds use in multi-participant interactivity may be rendered. Non-limiting examples of simulated objects include a simulated ball, frisbee, ring, puck, or a simulated version of any other object used in physical activities, e.g., athletic activities.

Similarly, the physical input can be any physical movement(s) that are performed while engaged in multi-participant interactivities, e.g., physical activities, such as athletic activities. Non-limiting examples of such physical movements include throwing, hitting, kicking, and/or the like, the object being simulated, e.g., a ball, frisbee, puck, ring, etc. The physical input can also be provided via an electronic input device (e.g., hand-held input device, such as a device akin to a Nintendo Wii Remote or the like) that can be used in video games as a substitute for a sport equipment. Therefore, the physical input can be hitting a simulated object with a racket or bat, for example, serving a simulated tennis ball with an electronic input device used as a tennis racket, etc. Similarly, physical input can be hitting a simulated hockey puck with an electronic input device used as a hockey stick. Additional embodiments of simulated objects and physical inputs that can be used in physical activities, particularly, athletic activities using the simulated objects are known and such embodiments are encompassed within the present disclosure.

The methods of the present disclosure comprise receiving, by the one or more processors, a first response by the second individual to the first stimulus. According to the present disclosure, the possible types of responses of an individual to a stimulus are numerous and will vary depending upon the type of multi-participant interactivity. Non-limiting examples of a response of an individual to a stimulus include catching a ball, dodging a ball, stopping a ball from going into a simulated net, hitting the ball to return to the server, hitting the ball in a simulated field, and any response that performed while engaged in physical activities, particularly, athletic activities. The response can also be provided via electronic device (as described above) that can be used in video games as substitute for a sport equipment. Therefore, a response can be hitting a simulated object with a racket, for example, returning a simulated tennis ball presented as a stimulus with an electronic gadget used as a tennis racket. A response can be hitting a simulated baseball presented as a stimulus with an electronic gadget used as a baseball bat. A response can be hitting a simulated cricket ball presented as a stimulus with an electronic gadget used as a cricket bat. A response can also be blocking a simulated puck with an electronic gadget used as a hockey stick and/or hockey glove to prevent the simulated goal from entering a simulated net. Additional embodiments of simulated objects and responses that can be used in physical activities, particularly, athletic activities using the simulated objects are well known in the art and such embodiments are within the purview of the invention.

For example, the steps described above may comprise rendering a first simulated object (e.g., a ball) to a first individual and receiving a first physical input produced by the first individual directed to the first simulated object. The first physical input is then applied to the first simulated object to produce a first stimulus, which is the first simulated object under the influence of the first physical input. The first stimulus is presented to the second individual who then attempts to respond to the first stimulus, for example, by catching the first simulated object. The response of the second individual to the first stimulus, for example, success or failure in catching the first simulated object is received and this response may be used to modify the second physical input.

The methods of the present disclosure may further comprise rendering a second simulated object to the first individual and receiving a second physical input produced by the first individual directed to the first simulated object. The second physical input is then modified according to the response of the second individual to the first stimulus. For example, if the second individual caught the first simulated object, the second physical input may not be modified or may be made stronger. On the other hand, if the second individual dropped the first simulated object, the second physical input may be made weaker so than an easier challenge is presented to the second individual following the failure in the second individual's response to the first stimulus.

The methods of the present disclosure may further comprise applying the modified second physical input to the second simulated ball to produce a second stimulus, which is the second simulated object under the influence of the modified second physical input. The second stimulus is then presented to the second individual who then attempts to react to the second stimulus, for example, by catching the second simulated object. The second response of the second individual to the modified second stimulus is then received. The modification of the second physical input based on the first response of the second individual ensures that the second individual is engaged in the game, i.e., does not constantly succeed or constantly fail.

The steps discussed in the preceding paragraphs may be employed to assess the skill level of the second individual in terms of responding to the stimuli. In certain embodiments, the skill level of the first individual of responding to stimuli presented from the second individual are determined.

Accordingly, certain embodiments of the invention provide a computer-implemented method for difficulty-adjusted multi-participant interactivity, comprising: rendering, via the one or more processors, a third simulated object to a second individual; receiving, by the one or more processors, a third physical input produced by the second individual directed to the third simulated object; applying, via the one or more processors, the third physical input to the third simulated object to produce a third stimulus comprising the third simulated object under the influence of the third physical input; presenting, via the one or more processors, the third stimulus to a first individual; receiving, by the one or more processors, a third response by the first individual to the third stimulus; rendering, via the one or more processors, a fourth simulated object to the second individual; receiving, by the one or more processors, a fourth physical input produced by the second individual directed to the fourth simulated object; modifying, via the one or more processors, the fourth physical input to produce a modified fourth physical input based on the third response by the first individual to the third stimulus; applying, via the one or more processors, the modified fourth physical input to the fourth simulated object to produce a fourth stimulus comprising the fourth simulated object under the influence of the modified fourth physical input; and presenting, via the one or more processors, the fourth stimulus to the first individual.

The steps described above can comprise rendering a third simulated object (e.g., ball or the like) to a second individual and receiving a third physical input produced by the second individual directed to the third simulated object. The third physical input is then applied to the third simulated object to produce a third stimulus, which is the third simulated object under the influence of the third physical input. The third stimulus is presented to a first individual who then attempts to react to the third stimulus, for example, by catching the third simulated object. The response of the first individual to the third stimulus, for example, success or failure in catching the third simulated object is received and this response may be used later in the method to modify the fourth physical input.

Further steps may comprise rendering a fourth simulated object to the second individual and receiving a fourth physical input produced by the second individual directed to the fourth simulated object. The fourth physical input is then modified according to the response of the first individual to the third stimulus. For example, if the first individual caught the third simulated object, the fourth physical input may not be modified or may be made stronger. On the other hand, if the first individual dropped the third simulated object, the fourth physical input may be made weaker so than an easier challenge is presented to the first individual following the failure in the first individual's response to the third stimulus.

Subsequent steps comprise applying the modified fourth physical input to the fourth simulated object to produce a fourth stimulus, which is the fourth simulated object under the influence of the modified fourth physical input. The fourth stimulus is then presented to the first individual who then attempts to react to the fourth stimulus, for example, by catching the fourth simulated object. The fourth response of the first individual to the modified fourth stimulus is then received. The modification of the fourth physical input based on the third response of the first individual ensures that the first individual is engaged in the game, i.e., does not constantly succeed or constantly fail.

The steps discussed in the preceding paragraphs may be used to assess the skills of the first individual in terms of reacting to the stimuli.

In further embodiments, the skills of the second individual of responding to the stimuli presented by the first individual are determined repeatedly and subsequent stimuli are modified accordingly. Thus, in one embodiment, after receiving the response of the second individual to the second stimulus; the method further comprises: rendering, via the one or more processors, a fifth simulated object to the first individual; receiving, by the one or more processors, a fifth physical input produced by the first individual directed to the fifth simulated object; modifying, by the one or more processors, the fifth physical input to produce a modified fifth physical input based on the second response by the second individual to the second stimulus; applying, via the one or more processors, the modified fifth physical input to the fifth simulated object to produce a fifth stimulus comprising the fifth simulated object under the influence of the modified fifth physical input; and presenting, via the one or more processors, the fifth stimulus to the second individual; and receiving, by the one or more processors, a fifth response by the second individual to the fifth stimulus.

Thus, in certain embodiments, the methods comprise receiving the response of the second individual to the second stimulus, e.g., for example, catching the second simulated object, e.g., ball. The method further comprises rendering a fifth simulated object to the first individual and receiving a fifth physical input produced by the first individual directed to the fifth simulated object. The fifth physical input is then modified to produce a modified fifth physical input based on the second response by the second individual to the second stimulated object. For example, if the second individual caught the second simulated object, the fifth physical input may not be modified or may be made stronger. On the other hand, if the second individual dropped the second simulated object, the fifth physical input may be made weaker so than an easier challenge is presented to the second individual following the failure in the second individual's response to the second stimulus.

Thus, the input from the first individual can be modified based on the response of the second individual to the previous challenge. If the second individual fails in the previous challenge, the following stimulus is made easier; whereas, if the second individual succeeds in the previous challenge, the following stimulus is unchanged or made more difficult.

Conversely, the skill level of the first individual of responding to the stimuli presented by the second individual are determined repeatedly and subsequent stimuli are modified accordingly. Thus, in one embodiment, after receiving the response of the first individual to the fourth stimulus; the method further comprises: rendering, via the one or more processors, a sixth simulated object to the second individual; receiving, by the one or more processors, a sixth physical input produced by the second individual directed to the sixth simulated object; modifying, by the one or more processors, the sixth physical input to produce a modified sixth physical input based on the fourth response by the first individual to the fourth stimulus; applying, via the one or more processors, the modified sixth physical input to the sixth simulated object to produce a sixth stimulus comprising the sixth simulated object under the influence of the modified sixth physical input; and presenting, via the one or more processors, the sixth stimulus to the first individual; and receiving, by the one or more processors, a sixth response by the first individual to the sixth stimulus.

Thus, in certain embodiments, the methods comprise receiving the response of the first individual to the fourth stimulus, e.g., for example, catching the fourth simulated object, e.g., ball. The method may further comprise rendering a sixth simulated object to the second individual and receiving a sixth physical input produced by the second individual directed to the sixth simulated object. The sixth physical input is then modified to produce a modified sixth physical input based on the fourth response by the first individual to the fourth stimulated object. For example, if the first individual caught the fourth simulated object, the sixth physical input may not be modified or may be made stronger. On the other hand, if the first individual dropped the fourth simulated object, the sixth physical input may be made weaker so than an easier challenge is presented to the first individual following the failure in the first individual's response to the fourth stimulus.

Thus, the input from the second individual can be modified based on the response of the first individual to the previous challenge. If the first individual fails in the previous challenge, the following stimulus is made easier; whereas, if the first individual succeeds in the previous challenge, the following stimulus is unchanged or made more difficult.

The steps of rendering simulated objects to a first individual and a second individual and presenting the stimuli to the first individual and the second individual can be alternated. For example, the sequence of stimuli can be as follows: (1) presenting the first stimulus to the second individual; (2) presenting the third stimulus to the first individual; (3) presenting the second stimulus to the second individual; (4) presenting the fourth stimulus to the first individual; (5) presenting the fifth stimulus to the second individual; and (6) presenting the sixth stimulus to the first individual.

According to any of the methods of the present disclosure, a suitable combination of hardware and software is employed to perform the steps of the methods, which hardware and software will vary depending upon the activity in which the two or more individuals participate. In one non-limiting example, and with respect to rendering a simulated object, using the first individual's (p1) hand position (x,y,z) as captured by the hardware (e.g., augmented reality (AR) hardware), the system renders an object on p1's hand, glove, tool (e.g., bat, racket, etc.), and/or the like of size S. With respect to receiving a physical input produced by an individual directed to a simulated object, and continuing on from the example described above, while the simulated object follows p1's hand, the system may derive a movement vector from p1's (x,y,z) changes in time which will determine the output direction of the object (vector direction x,y,z) as well as the speed (vector norm, s). This may be accomplished, e.g., by calculating the average of the subtraction of the last N captured (x,y,z) positions by the hardware, that is:

1/N*((x1−x2, y1−y1, z1−z2)+(x2−x3, y2−y3, z2−z3)+ . . . (xn−xn1, yn−yn1, zn, zn1)) and same for the norm.

With respect to applying a physical input to a simulated object to produce a stimulus comprising the simulated object under the influence of the physical input, in some embodiments, such may be performed as follows. At the release trigger (hardware will detect p1 opening his/her hand), the system will start moving the ball with the direction and speed as computed during the previous step. The effective values of direction and speed O(x,y,z,s) may be a linear transformation of the computed vector M(x,y,z,s): O(x,y,z,s)=T*M(x,y,z,s) so as to scale the movement of the simulated object to a feasible real-world scale. These values are sent to the server in order to be forwarded to a second individual.

The presentation of stimuli to individuals may be performed using a variety of approaches. In one non-limiting example, and continuing on from the example described above, at the time the values are forwarded to a second individual (p2), p2 will receive the movement data from the server, and will start to see the simulated object move towards him/her as determined by O(x,y,z,s). The movement of the simulated object will be affected by gravity and friction as it would in the real world, effectively changing, on every simulation step, y=y−Gr and s=s−Fr.

Various approaches may be implemented to receive responses from individuals to stimuli. In one non-limiting example, and continuing on from the example described above, the server receives a message depending upon whether p2 caught the ball and will update its parameters accordingly, increasing speed and decreasing size if the ball was caught, or decreasing speed and increasing size otherwise, so:

If(ball caught)
S=−Sz*S
s=−Sp*s
Else
S=Sz*S
s=−Sp*s

Modifications of physical inputs to produce modified physical inputs based on responses of individuals to stimuli may be performed using any suitable approaches. Adaptive methodologies/algorithms that may be employed include, but are not limited to, parameter estimation by sequential testing (PEST), maximum-likelihood procedures, and staircase procedures. According to certain embodiments, the modification/adaptation is achieved using PEST, which is characterized by an algorithm for threshold searching that changes both step sizes and direction (i.e., increasing and decreasing level) across a set of trials. Changes in step size are used to focus the adaptive track ever more finely, stopping the track when the estimate has been adequately defined. The final estimate is simply the final value determined by the trial placement procedure. The PEST algorithm is designed to place trials at the most efficient locations along the stimulus axis in order to increase measurement precision while minimizing the number of trials required to estimate a threshold.

In certain embodiments, physical input modification/adaptation is effected using maximum-likelihood procedures. In maximum-likelihood procedures, sets of stimulus-response trials are fit with an ogival function and subsequent trial placement and threshold estimation is taken from those fitted functions. Maximum-likelihood procedures are characterized by stimulus placement on each trial, driven by consulting the current best estimate of the entire underlying function after every stimulus—response trial. As the adaptive track grows in length, the estimated function becomes better defined by the collection of data points generated from previous trials. After each trial, the set of stimulus levels and the proportion of correct responses associated with each level are combined to form a function. The individual points are fitted with an ogival function and a current estimated threshold level is extracted. A new function is generated after each trial or set of trials, and subsequent trials are placed at a targeted performance level on the most up-to-date function. A maximum-likelihood fitting algorithm is typically used with this type of procedure.

According to certain embodiments, physical input modification/adaptation is achieved using an adaptive staircase algorithm/procedure. Staircase procedures generally use the previous one or more responses within an adaptive track to select the next trial placement, then provide a threshold estimate in a variety of ways, e.g., by averaging the levels at the direction reversals in the adaptive track (i.e., the turnaround points). Up-down staircases call for a reduction in stimulus level when the subject's response is positive and an increase in stimulus level when the response is negative. Beginning at a level above threshold, positive responses lead to continued decreases in stimulus level until a negative response occurs. This triggers a reversal in the direction of the track, and levels on subsequent trials increase until the next change in response. The up-down staircase procedure targets the 50% performance level on a function that extends from 0% correct performance at chance to 100% correct performance. That is, the track targets the stimulus level for which the probability of a correct response equals the probability of an incorrect response or, equivalently, the level at which the track would move up or down on the stimulus axis with equal probability. The value of this type of procedure is in the very few assumptions necessary for its implementation. To target a higher performance level, the sequence for a downward movement may be two or more positive responses, and the sequence for an upward movement may remain at one negative response. This example is a two-down, one-up procedure, which targets the 70.7% level on the function. Recalling that the probability of the down sequence must equal the probability of an up sequence, a positive response to two consecutive trials must occur in order to move the track downward. If p is the probability of a positive response on a given trial, then p×p must equal 0.50, and therefore the target probability is 0.707. Similarly, a three-down, one-up transformation leads to a performance target of 0.794 ($p^3$=0.50; the cube root of 0.50 is 0.794).

In one non-limiting example of a physical input modification procedure, and continuing on from the example described above, depending upon whether p2 caught the ball, p1's output will change as follows:

Server will increase or decrease S depending upon whether p2 caught the ball, (S=+−Sz*S)

Server will increase or decrease s depending upon whether p2 caught the ball (s=+−Sp*s)

With respect to applying modified physical inputs to simulated objects to produce stimuli comprising simulated objects under the influence of the modified inputs, various approaches may be implemented. In one non-limiting example, and continuing on from the example described above, at trigger release, the movement parameters O(x,y, z,s) will have been modified by the server update of s, as well the size of the object S, so the new simulated object will be bigger or smaller, move faster or slower, and/or the like, depending upon p2's response to the first throw.

In some embodiments, the steps of rendering or presenting used in the methods disclosed herein can be performed via a display, e.g., a head-mounted display. A head-mounted display can render a three-dimensional version of the simulated objects. Non-limiting examples of head-mounted displays include headsets or glasses, for example, virtual and/or augmented reality headsets or virtual and/or augmented reality glasses. A head-mounted display that finds use in the methods and systems of the present disclosure include Microsoft's HoloLens 2 head-mounted display. Additional examples of head-mounted displays are known in the art and such embodiments are within the present disclosure.

The steps of receiving responses may be performed, e.g., by capturing via a motion capture device the body movements of the first individual, the second individual, or both. The motion capture device may comprise a video camera, such as video recording glasses, a GOPRO camera, a body camera, or the like. Motion/position capture devices that find use in detecting body movement are available and include Microsoft's Kinect motion capture device (e.g., the Microsoft Kinect for Windows v2, Microsoft Azure Kinect DK), Sony's EyeToy® motion capture device, and the like. According to certain embodiments, body movement is detected using sensors (e.g., wired or wireless sensors) worn on the body of the first and/or second individual. Such sensors may be worn on one or both of an individual's arms, one or both of an individual's legs, and/or any other useful location on the individual's body for detecting the individual's movement and/or position. In certain aspects, the sensors are "wireless" sensors that communicate wirelessly with the system being implemented to the carry out the method. Such wireless sensors are known and include the PrioVR motion-tracking body suits available from YEI Corporation (Portsmouth, Ohio). Additional examples of motion capture devices are known in the art and such embodiments are within the present disclosure.

The physical input from an individual may comprise application of force by the individual via body movement towards the simulated object. The strength of the physical input can be determined by the speed of the body motion by the individual, calibrated strength of the individual, strength of the individual as provided by the individual into the computer system, or the strength of the individual estimated by the computer system based on age, gender, height, weight, and/or additional physical characteristics of the individual.

Similarly, the response of an individual comprises reactionary body movement by the individual towards the corresponding stimulus. The success or failure of the individual in response to the stimulus is determined by the computer system based on the positioning of the individual, the reaction speed of the individual, position of the individual's fingers relative to the simulated object, grasping of the simulated by the fingers, movements of the individual's legs, movements of the individual's head, and any additional physical aspects that affect the success or failure of the response. For example, whether an individual caught or dropped a simulated object (e.g., ball) could be determined by the computer system based on the position of the individual's hand, reaction speed of the individual in getting the hands in the right position, skills of the individual in maintaining the hands in the right position, and position and movement of the fingers of the individual in grasping the simulated object.

In some embodiments, modifying any of the physical inputs may comprise changing the strength, the direction, or both.

Additionally, the size of the simulated object can also be made bigger or smaller based on the success or failure in the previous trial. For example, a ball can be made smaller or larger to make it more difficult or less difficult for a recipient to catch, dodge, hit, or block the ball. Additional visual parameters of the simulated objects can be changed, for example, color or patterns on the simulated object, to make the objects more visible or less visible, and thus, more difficult or less difficult to respond.

In addition to changing the difficulty of a given stimulus based on modifying the physical input, the difficult of a given stimulus can be further changed by presenting one or more additional stimuli along with the presented stimulus under the influence of the modified physical input. These additional stimuli can be used as "distractors" and are designed to make the task more difficult for the recipient of the stimulus. The number and types of distractors can be changed to make the response to the stimulus more difficult or less difficult compared to the previous challenge.

Computer-Readable Media and Devices

Also provided are computer readable media comprising instructions for implementing a computer-implemented method for difficulty-adjusted multi-participant interactivity and devices comprising such computer readable media.

In certain aspects, provided is a non-transitory computer readable medium including instructions for carrying out the methods for difficulty-adjusted multi-participant interactivity, where the instructions, when executed by one or more processors, cause the one or more processors to implement the methods disclosed above for difficulty-adjusted multi-participant interactivity.

Various steps of rendering the simulated objects, receiving the physical inputs, applying the physical inputs, presenting stimuli, receiving the responses to the stimuli, modifying the physical inputs, and producing stimuli under the influence of the modified physical inputs may be as described in the Methods section above. For purposes of brevity, details regarding these steps and other features/ elements described in the Methods section of the present disclosure are incorporated but not reiterated herein. In some embodiments, the instructions, when executed by one or more processors, cause the one or more processors to perform any of the steps of the methods described in the Methods section herein, in any desired combination.

In certain embodiments, provided are one or more non-transitory computer-readable media comprising instructions stored thereon, which when executed by the one or more processors, cause the one or more processors to: render a first simulated object to a first individual; receive a first physical input produced by the first individual directed to the first simulated object; apply the first physical input to the first simulated object to produce a first stimulus comprising the first simulated object under the influence of the first physical input; present the first stimulus to a second individual; receive a first response by the second individual to the first stimulus; render a second simulated object to the first individual; receive a second physical input produced by the first individual directed to the second simulated object; modify the second physical input to produce a modified second physical input based on the first response by the second individual to the first stimulus; apply the modified second physical input to the second simulated object to produce a second stimulus comprising the second simulated object under the influence of the modified second physical input; and present the second stimulus to the second individual. According to some embodiments, the one or more non-transitory computer-readable media further comprise instructions stored thereon, which when executed by the one or more processors, cause the one or more processors to: render a third simulated object to the second individual; receive a third physical input produced by the second individual directed to the third simulated object; apply the third physical input to the third simulated object to produce a third stimulus comprising the third simulated object under the influence of the third physical input; present the third stimulus to the first individual; receive a third response by the first individual to the third stimulus; render a fourth simulated object to the second individual; receive a fourth physical input produced by the second individual directed to the fourth simulated object; modify the fourth physical input to produce a modified fourth physical input based on the third response by the first individual to the third stimulus; apply the modified fourth physical input to the fourth simulated object to produce a fourth stimulus comprising the fourth simulated object under the influence of the modified fourth physical input; and present the fourth stimulus to the first individual. As will be appreciated, the one or more non-transitory computer readable media may further comprise instructions that cause the one or more processors to perform any steps of the methods of the present disclosure, in any desired combination.

Instructions may be coded onto a non-transitory computer-readable medium in the form of "programming," where the term "computer-readable medium" as used herein refers to any non-transitory storage or transmission medium that participates in providing instructions and/or data to a computer for execution and/or processing. Examples of storage media include a hard disk, optical disk, magneto-optical disk, CD-ROM, CD-R, magnetic tape, non-volatile memory card, ROM, DVD-ROM, Blue-ray disk, solid state disk, network attached storage (NAS), etc., whether such devices are internal or external to the computer. A file containing information can be "stored" on computer readable medium, where "storing" means recording information such that it is later accessible and retrievable by a computer.

The instructions may be in the form of programming that is written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as many others.

The present disclosure also provides computer devices (sometimes referred to herein as "systems"). The computer devices include one or more processors and any of the non-transitory computer readable media of the present disclosure. Accordingly, in some embodiments, the computer devices can perform any of the methods described in the Methods section herein.

In certain aspects, a computer device of the present disclosure is a local computer device. In some embodiments, the computer device is a remote computer device (e.g., a remote server), meaning that the instructions are executed on a computer device different from a local computer device and/or the instructions are downloadable from the remote computer device to a local computer device, e.g., for execution on the local computer device. In some embodiments, the instructions constitute a web-based application stored on a remote server.

A variety of processor-based devices/systems may be employed to implement the embodiments of the present disclosure. Such systems may include system architecture wherein the components of the system are in electrical communication with each other using a bus. System architecture can include a processing unit (CPU or processor), as well as a cache, that are variously coupled to the system bus. The bus couples various system components including system memory, (e.g., read only memory (ROM) and random access memory (RAM), to the processor.

System architecture can include a cache of high-speed memory connected directly with, in close proximity to, or integrated as part of the processor. System architecture can copy data from the memory and/or the storage device to the cache for quick access by the processor. In this way, the cache can provide a performance boost that avoids processor delays while waiting for data. These and other modules can control or be configured to control the processor to perform various actions. Other system memory may be available for use as well. Memory can include multiple different types of memory with different performance characteristics. Processor can include any general purpose processor and a hardware module or software module, such as first, second and third modules stored in the storage device, configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

To enable user interaction with the computing system architecture, an input device can represent any number of input mechanisms, such as a microphone for speech, a touch-sensitive screen for gesture or graphical input, keyboard, mouse, motion input, speech and so forth. An output device can also be one or more of a number of output mechanisms. In some instances, multimodal systems can enable a user to provide multiple types of input to communicate with the computing system architecture. A communications interface can generally govern and manage the user input and system output. There is no restriction on operating on any particular hardware arrangement and therefore the basic features here may easily be substituted for improved hardware or firmware arrangements as they are developed.

The storage device is typically a non-volatile memory and can be a hard disk or other types of computer-readable media which can store data that are accessible by a computer, such as magnetic cassettes, flash memory cards, solid state memory devices, digital versatile disks, cartridges, random access memories (RAMs), read only memory (ROM), and hybrids thereof.

The storage device can include software modules for controlling the processor. Other hardware or software modules are contemplated. The storage device can be connected to the system bus. In one aspect, a hardware module that performs a particular function can include the software component stored in a computer-readable medium in connection with the necessary hardware components, such as the processor, bus, output device, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Notwithstanding the appended claims, the present disclosure is also defined by the following embodiments:

1. A computer-implemented method for difficulty-adjusted multi-participant interactivity, comprising:
rendering, via one or more processors, a first simulated object to a first individual;
receiving, by the one or more processors, a first physical input produced by the first individual directed to the first simulated object;
applying, via the one or more processors, the first physical input to the first simulated object to produce a first stimulus comprising the first simulated object under the influence of the first physical input;
presenting, via the one or more processors, the first stimulus to a second individual;
receiving, by the one or more processors, a first response by the second individual to the first stimulus;
rendering, via the one or more processors, a second simulated object to the first individual;
receiving, by the one or more processors, a second physical input produced by the first individual directed to the second simulated object;
modifying, via the one or more processors, the second physical input to produce a modified second physical input based on the first response by the second individual to the first stimulus;
applying, via the one or more processors, the modified second physical input to the second simulated object to produce a second stimulus comprising the second simulated object under the influence of the modified second physical input; and
presenting, via the one or more processors, the second stimulus to the second individual.

2. The method according to embodiment 1, further comprising:
rendering, via the one or more processors, a third simulated object to the second individual;
receiving, by the one or more processors, a third physical input produced by the second individual directed to the third simulated object;
applying, via the one or more processors, the third physical input to the third simulated object to produce a third stimulus comprising the third simulated object under the influence of the third physical input;
presenting, via the one or more processors, the third stimulus to the first individual;
receiving, by the one or more processors, a third response by the first individual to the third stimulus;
rendering, via the one or more processors, a fourth simulated object to the second individual;
receiving, by the one or more processors, a fourth physical input produced by the second individual directed to the fourth simulated object;
modifying, via the one or more processors, the fourth physical input to produce a modified fourth physical input based on the third response by the first individual to the third stimulus;
applying, via the one or more processors, the modified fourth physical input to the fourth simulated object to produce a fourth stimulus comprising the fourth simulated object under the influence of the modified fourth physical input; and
presenting, via the one or more processors, the fourth stimulus to the first individual.

3. The method of embodiment 2, wherein the stimuli are presented in the following order: the first stimulus, the third stimulus, the second stimulus, and the fourth stimulus.

4. The method according any one of embodiments 1 to 3, further comprising:

receiving, by the one or more processors, a second response by the second individual to the second stimulus;

rendering, via the one or more processors, a fifth simulated object to the first individual;

receiving, by the one or more processors, a fifth physical input produced by the first individual directed to the fifth simulated object;

modifying, by the one or more processors, the fifth physical input to produce a modified fifth physical input based on the second response by the second individual to the second stimulus;

applying, via the one or more processors, the modified fifth physical input to the fifth simulated object to produce a fifth stimulus comprising the fifth simulated object under the influence of the modified fifth physical input; and presenting, via the one or more processors, the fifth stimulus to the second individual; and receiving, by the one or more processors, a fifth response by the second individual to the fifth stimulus.

5. The method of any one of embodiments 1 to 4, further comprising:

receiving, by the one or more processors, a fourth response by the first individual to the fourth stimulus;

rendering, via the one or more processors, a sixth simulated object to the second individual;

receiving, by the one or more processors, a sixth physical input produced by the second individual directed to the sixth simulated object;

modifying, by the one or more processors, the sixth physical input to produce a modified sixth physical input based on the fourth response by the first individual to the fourth stimulus;

applying, via the one or more processors, the modified sixth physical input to the sixth simulated object to produce a sixth stimulus comprising the sixth simulated object under the influence of the modified sixth physical input;

presenting, via the one or more processors, the sixth stimulus to the first individual; and receiving, by the one or more processors, the sixth response by the second individual to the sixth stimulus.

6. The method of any one of embodiments 1 to 5, wherein any step of rendering or presenting comprises rendering or presenting via a head-mounted display.

7. The method of any one of embodiments 1 to 6, wherein any step of receiving comprises capturing via a motion capture device the body movements of the first individual, the second individual, or both.

8. The method of any one of embodiments 1 to 7, wherein the simulated objects are independently selected from a ball, frisbee, ring, or a puck.

9. The method of any one of embodiments 1 to 8, wherein any of the physical inputs comprises application of force by the individual via body movement towards the simulated object.

10. The method of any one of embodiments 1 to 9, wherein any of the responses comprises reactionary body movement by the individual towards the corresponding stimulus.

11. The method of any one of embodiments 1 to 10, wherein modifying any of the physical inputs comprises changing the strength, the direction, or both, of the physical input.

12. The method of any one of embodiments 1 to 11, further comprising presenting, via the one or more processors, one or more additional stimuli, each additional stimulus comprising an additional simulated object, wherein the one or more additional stimuli are presented simultaneously with one or more of the first, second, third, fourth, fifth, and sixth stimuli.

13. The method of any one of embodiments 1 to 12, further comprising modifying, via the one or more processors, the visual parameters of the second simulated object based on the first response by the second individual and/or modifying, via the one or more processors, the visual parameters of the fifth simulated object based on the second response by the second individual.

14. The method of any one of embodiments 2 to 13, further comprising modifying, via the one or more processors, the visual parameters of the fourth simulated object based on the third response by the first individual and/or modifying, via the one or more processors, the visual parameters of the sixth simulated object based on the fourth response by the first individual.

15. The method of embodiment 13 or embodiment 14, wherein modifying the visual parameters of any one of the simulated objects comprises changing the size and/or color of the simulated object.

16. One or more non-transitory computer readable medium comprising instructions, which when executed by one or more processors, cause the one or more processors to perform the method according to any one of embodiments 1 to 15.

17. A computer device, comprising:
one or more processors; and
the one or more non-transitory computer readable medium of embodiment 16.

EXPERIMENTAL

Example 1—The Holographic Embodied Attention Trainer (HEAT)

The HEAT project provides an augmented reality/motion capture cognitive enhancement, closed-loop video game directed at improving attention abilities. This technology can improve the lives of individuals who are healthy as well as those suffering from cognitive deficits. Thus, this technology can be used as a novel neurotherapeutic.

Figure 3A:
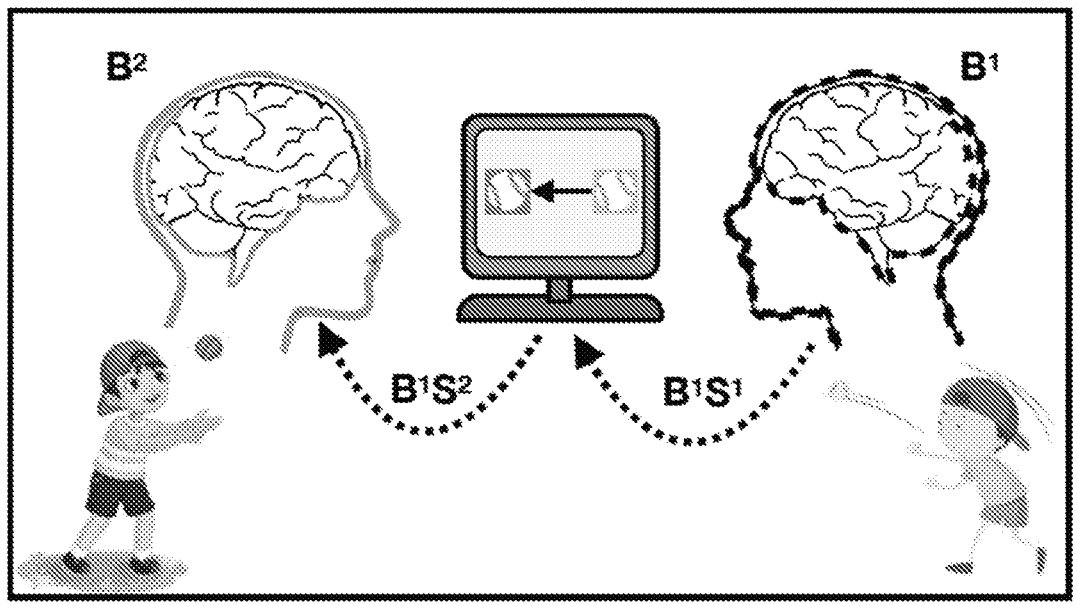
FIG. 3A: An example of the computer-implemented methods for difficulty-adjusted multi-participant interactivity according to embodiments of the present disclosure. Player 1 ($B^1$) throws ball (stimulus 1 ($S^1$)) to Player 2 ($B^2$). The computer records this input and adjusts the ball flight parameters ($S^2$) for $B^2$ based upon how $B^1$ throws ($B^1S^1$) and how $B^2$ performed on the last catch (or attempted catch). i.e., $B^2D^1=B^1S^1\pm B^2D^1$.
Figure 3B:
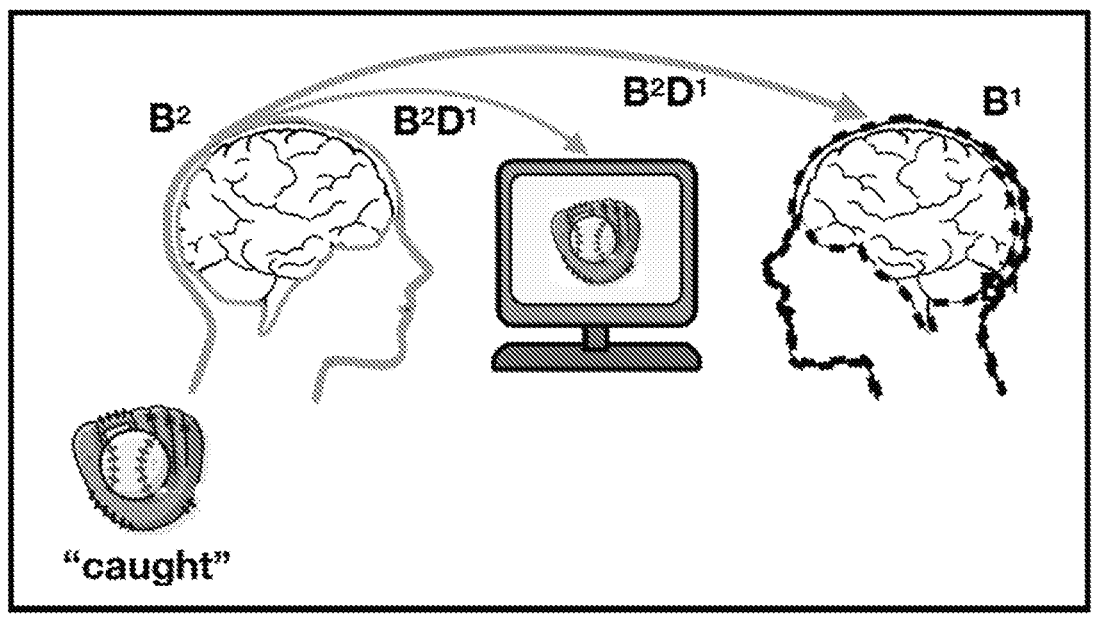
FIG. 3B: An example of the computer-implemented methods for difficulty-adjusted multi-participant interactivity according to embodiments of the present disclosure. After the steps described in FIG. 3A, $B^2$ catches the ball in this example and the performance data ($D^1$) associated with this catch is recorded by both the computer and $B^1$.
Figure 3C:
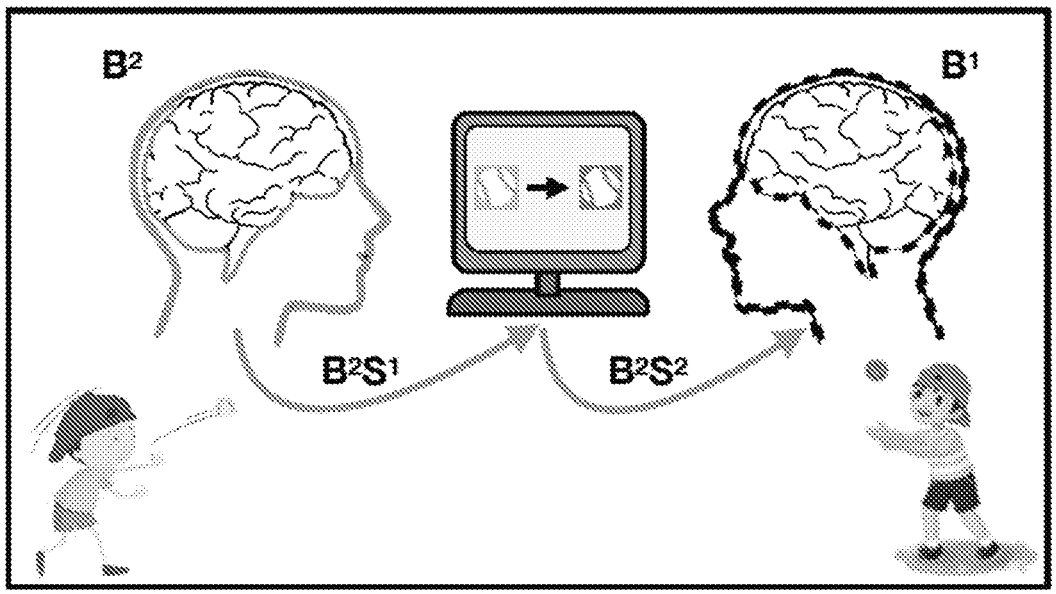
FIG. 3C: An example of the computer-implemented methods for difficulty-adjusted multi-participant interactivity according to embodiments of the present disclosure. After the steps described in FIG. 3B, it is $B^2$'s turn to throw the ball. $B^2$ throws the ball (stimuli ($S^1$)) to $B^1$. Computer records this information and adjusts ball flight parameters ($S^2$) for $B^2$ based on how $B^2$ throws ($B^2S^1$) and how $B^1$ performed on the last catch, i.e., $B^1D^1=B^1S^1\pm B^2D^1$.
Figure 3D:
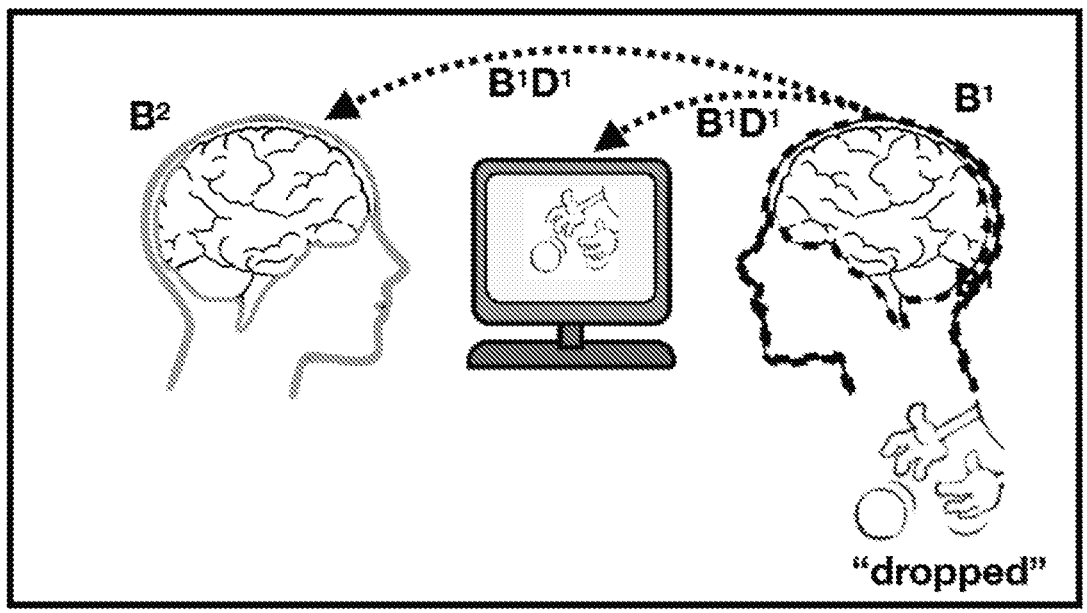
FIG. 3D: An example of the computer-implemented methods for difficulty-adjusted multi-participant interactivity according to embodiments of the present disclosure. After the steps described in FIG. 3C, $B^1$ drops the ball in this instance, and the performance data ($D^1$) associated with the drop is recorded by both the computer and $B^2$.

HEAT is an immersive two (or more) person interactive video game that involves both cognitive and physical challenges in an engaging and enjoyable holographic game. Each player wears an Augmented Reality (AR) Head-mounted Display (HMD) and faces one other. The HMD has a camera that captures their body movements, with each person's body movements generating the holographic images. The players alternate between one of the two roles: trainer or trainee (e.g., 'thrower' or 'catcher'; FIGS. 3A-3D). The trainer is tasked with throwing holographic balls at the trainee, while the trainee catches or blocks specific balls and avoids others depending on the challenge, for example, only catch red and green balls and/or kick all yellow balls. This type of cognitive challenge places intensive demands on the perception, attention, and decision-making faculties of the trainee. Such adaptive play can harness neuroplasticity and result in improved cognitive abilities over time. Because of the demands to move and react, the players are challenged both physically and cognitively in an interactive manner.

For the challenge level of the game to not fall under the complete control of the trainer, who sets the pace, the specific nature of the holographic targets is guided by adaptive algorithms that are informed by assessments of the other player's skills. This allows the object(s) thrown by the trainer to maintain task difficulty at an appropriate level to the trainee's skills. Such an adaptive closed-loop approach is a core mechanic of therapeutic video games. The stimuli could have several factors that change as a function of the trainee's abilities, such as number, size, speed, and visibility of the simulated objects presented as stimuli and as distractors.

HEAT could be played as a single-player game against a computer or as a team-game with multiple individuals competing or working collaboratively. The multi-player/social aspect of this game is anticipated to have synergistic effects on the cognitive benefits observed, given similar effects found in-group treatment settings. Training adherence has been shown to be augmented when a regular partner is involved.

In one example of HEAT, a 12-year old boy and his grandmother play HEAT. They can begin with a thresholding procedure against a computer, which allows the computer-system to assess a person's baseline physical and cognitive abilities. While such base-line assessment is not necessary, it can guide the opening round of play. Regardless, in the first round, the grandmother is the trainer. Her goal is to get the ball(s) past her grandson into the net. Each time she makes a throw, three balls appear and travel at a rapid speed to challenge the boy's fairly-high physical and cognitive abilities at an appropriate level. He blocks the specific target ball and ignores the distractor balls, and over several minutes he improves, which results in the challenges gradually increasing to four smaller and faster balls and, thus, tougher to discriminate. His points are tallied, and he gets to take a break as they switch roles. Now the grandmother is the trainee. Each time the boy makes a throw only one ball is released, and it grows and travels towards the grandmother at a much slower rate, which has been calculated to appropriately challenge her abilities based upon her performance. She too improves over the rounds and the game advances to two balls at a time at greater speeds with a discrimination challenge introduced. Play advances back and forth until the game is over for the day. Their scores can appear in an augmented reality view. Thus, cognitive and physical fitness challenges have been delivered to both participants in a personalized, adaptive, enjoyable and interactive manner.

The preceding merely illustrates the principles of the present disclosure. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein.

What is claimed is:

1. A computer-implemented method for difficulty-adjusted multi-participant interactivity, the method being implemented using one or more processors and one or more non-transitory computer-readable media comprising instructions stored thereon, which when executed by the one or more processors, cause the one or more processors to perform operations comprising:
   rendering on a first display, via the one or more processors, a first simulated object to a first individual;
   receiving, by the one or more processors, a first physical input produced by the first individual via a first input device and directed to the first simulated object;
   applying, via the one or more processors, the first physical input to the first simulated object to produce a first stimulus comprising the first simulated object under the influence of the first physical input;
   presenting on a second display, via the one or more processors, the first stimulus to a second individual;
   receiving, by the one or more processors, a first physical response produced by the second individual via a second input device and directed to the first stimulus;
   rendering on the first display, via the one or more processors, a second simulated object to the first individual;
   receiving, by the one or more processors, a second physical input produced by the first individual via the first input device and directed to the second simulated object;
   modifying, via the one or more processors, the second physical input to produce a modified second physical input based on the first physical response by the second individual to the first stimulus;
   applying, via the one or more processors, the modified second physical input to the second simulated object to produce a second stimulus comprising the second simulated object under the influence of the modified second physical input; and
   presenting on the second display, via the one or more processors, the second stimulus to the second individual.

2. The method according to claim 1, further comprising:
   rendering on the second display, via the one or more processors, a third simulated object to the second individual;
   receiving, by the one or more processors, a third physical input produced by the second individual via the second input device and directed to the third simulated object;
   applying, via the one or more processors, the third physical input to the third simulated object to produce a third stimulus comprising the third simulated object under the influence of the third physical input;
   presenting on the first display, via the one or more processors, the third stimulus to the first individual;
   receiving, by the one or more processors, a third response produced by the first individual via the first input device and directed to the third stimulus;
   rendering on the second display, via the one or more processors, a fourth simulated object to the second individual;
   receiving, by the one or more processors, a fourth physical input produced by the second individual via the second input device and directed to the fourth simulated object;
   modifying, via the one or more processors, the fourth physical input to produce a modified fourth physical input based on the third physical response by the first individual to the third stimulus;
   applying, via the one or more processors, the modified fourth physical input to the fourth simulated object to produce a fourth stimulus comprising the fourth simulated object under the influence of the modified fourth physical input; and presenting on the first display, via the one or more processors, the fourth stimulus to the first individual.

3. The method according to claim 2, wherein the stimuli are presented in the following order: the first stimulus, the third stimulus, the second stimulus, and the fourth stimulus.

4. The method according to claim 1, further comprising:

receiving, by the one or more processors, a second physical response by the second individual to the second stimulus;

rendering on the first display, via the one or more processors, a fifth simulated object to the first individual;

receiving, by the one or more processors, a fifth physical input produced by the first individual via the first input device and directed to the fifth simulated object;

modifying, by the one or more processors, the fifth physical input to produce a modified fifth physical input based on the second response by the second individual to the second stimulus;

applying, via the one or more processors, the modified fifth physical input to the fifth simulated object to produce a fifth stimulus comprising the fifth simulated object under the influence of the modified fifth physical input; and presenting on the second display, via the one or more processors, the fifth stimulus to the second individual; and receiving, by the one or more processors, a fifth physical response produced by the second individual via the second input device and directed to the fifth stimulus.

5. The method according to claim 1, further comprising:

receiving, by the one or more processors, a fourth physical response produced by the first individual via the first input device and directed to the fourth stimulus;

rendering on the second display, via the one or more processors, a sixth simulated object to the second individual;

receiving, by the one or more processors, a sixth physical input produced by the second individual via the second input device and directed to the sixth simulated object;

modifying, by the one or more processors, the sixth physical input to produce a modified sixth physical input based on the fourth response by the first individual to the fourth stimulus;

applying, via the one or more processors, the modified sixth physical input to the sixth simulated object to produce a sixth stimulus comprising the sixth simulated object under the influence of the modified sixth physical input;

presenting on the first display, via the one or more processors, the sixth stimulus to the first individual; and receiving, by the one or more processors, the sixth physical response produced by the second individual via the second input device and directed to the sixth stimulus.

6. The method according to claim 1, wherein for any step of rendering or presenting, the display is a head-mounted display.

7. The method according to claim 1, wherein for any step of receiving, the first input device or the second input device is a motion capture device that captures the body movements of the first, individual or the second individual.

8. The method according to claim 1, wherein the simulated objects are independently selected from a ball, frisbee, ring, or a puck.

9. The method according to claim 1, wherein any of the physical inputs comprises application of force by the individual via body movement towards the simulated object.

10. The method according to claim 1, wherein any of the responses comprises reactionary body movement by the individual towards the corresponding stimulus.

11. The method according to claim 1, wherein modifying any of the physical inputs comprises changing the strength, the direction, or both, of the physical input.

12. The method according to claim 1, further comprising presenting on the first or the second display, via the one or more processors, one or more additional stimuli, each additional stimulus comprising an additional simulated object, wherein the one or more additional stimuli are presented simultaneously with one or more of the first, second, third, fourth, fifth, and sixth stimuli.

13. The method according to claim 1, further comprising modifying, via the one or more processors, the visual parameters of the second simulated object based on the first response by the second individual and/or modifying, via the one or more processors, the visual parameters of the fifth simulated object based on the second response by the second individual.

14. The method according to claim 1, further comprising modifying, via the one or more processors, the visual parameters of the fourth simulated object based on the third response by the first individual and/or modifying, via the one or more processors, the visual parameters of the sixth simulated object based on the fourth response by the first individual.

15. The method according to claim 13, wherein modifying the visual parameters of any one of the simulated objects comprises changing the size and/or color of the simulated object.

16. One or more non-transitory computer readable media comprising instructions, which when executed by one or more processors, cause the one or more processors to perform the method according to claim 1.

17. A computer device, comprising:
one or more processors; and
the one or more non-transitory computer readable media of claim 16.

* * * * *

UNITED STATES PATENT AND TRADEMARK OFFICE
CERTIFICATE OF CORRECTION

| | | |
|---|---|---|
| PATENT NO. | : 12,053,707 B2 | Page 1 of 1 |
| APPLICATION NO. | : 17/801350 | |
| DATED | : August 6, 2024 | |
| INVENTOR(S) | : Adam Gazzaley et al. | |

It is certified that error appears in the above-identified patent and that said Letters Patent is hereby corrected as shown below:

In the Specification

In Column 1, Line 10, after "which" delete "application".

In Column 2, Line 4, after "according" insert -- to --.

In Column 2, Line 7, delete "[B$^x$S2" and insert -- [B$^x$S$^2$ --.

In Column 17, Line 18, after "input;" delete "and".

In the Claims

In Column 22, Line 7, in Claim 7, delete "first," and insert -- first --.

Signed and Sealed this
Thirty-first Day of December, 2024

Derrick Brent
*Acting Director of the United States Patent and Trademark Office*